United States Patent
Prinet et al.

(10) Patent No.: US 9,979,897 B2
(45) Date of Patent: May 22, 2018

(54) SYSTEM AND METHOD FOR ADAPTIVE FLICKERING REDUCTION FROM VIDEO SEQUENCE

(71) Applicant: GM GLOBAL TECHNOLOGY OPERATIONS LLC, Detroit, MI (US)

(72) Inventors: Veronique C. Prinet, Paris (FR); Caroline Chung, Royal Oak, MI (US); Wende Zhang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 15/175,248

(22) Filed: Jun. 7, 2016

(65) Prior Publication Data

US 2017/0353650 A1  Dec. 7, 2017

(51) Int. Cl.
*H04N 5/235* (2006.01)
*G06T 7/00* (2017.01)
*G06K 9/46* (2006.01)
*G06K 9/62* (2006.01)
*G06K 9/00* (2006.01)

(52) U.S. Cl.
CPC ....... *H04N 5/2357* (2013.01); *G06K 9/00791* (2013.01); *G06K 9/4609* (2013.01); *G06K 9/6267* (2013.01); *G06T 7/0081* (2013.01); *H04N 5/2351* (2013.01); *H04N 5/2354* (2013.01); *G06T 2207/10016* (2013.01); *G06T 2207/20182* (2013.01)

(58) Field of Classification Search
CPC .. H04N 5/2357; H04N 5/2351; H04N 5/2354; G06K 9/6267; G06K 9/4609; G06K 9/00791; G06T 7/0081; G06T 2207/20182; G06T 2207/10016
See application file for complete search history.

(56) References Cited

U.S. PATENT DOCUMENTS

| | | | |
|---|---|---|---|
| 8,004,578 B2 | 8/2011 | Chao | |
| 2013/0287251 A1* | 10/2013 | Mitsui | G06K 9/6267 382/103 |
| 2015/0237282 A1 | 8/2015 | Shimada | |
| 2015/0264241 A1 | 9/2015 | Kleekajai et al. | |

* cited by examiner

*Primary Examiner* — Twyler Haskins
*Assistant Examiner* — Angel L Garces-Rivera
(74) *Attorney, Agent, or Firm* — Quinn IP Law (57) ABSTRACT

A method of detecting and correcting flicker. A video stream of a scene at various instances of time is captured by an image capture device. A local spatio-temporal feature extraction technique is applied, by a processor, to regions of the capture scene within each frame. Candidate flickering region detection is applied, by a classifier, to identify candidate regions. Corresponding candidate regions are tracked over time to detect illumination differences within each analyzed region. An illumination correction technique is applied to the candidate regions where flickering is detected. A flicker-free video is output on a display device.

20 Claims, 7 Drawing Sheets

Template T(x,y)

Frame 0:

Cell C(x,y) centered at (x0,y0)

Search Region I(x,y)

Frame 1

Detected positive cell at (x1,y1)

SYSTEM AND METHOD FOR ADAPTIVE FLICKERING REDUCTION FROM VIDEO SEQUENCE

BACKGROUND OF INVENTION

An embodiment relates to video processing.

Flickering is the apparent fluctuation of light in video, at a local or global scale. Flickering is due to the presence of non-uniform light source(s) in the imaged scene: when a camera captures successive frames of a scene which is illuminated by a light source which intensity varies in time, the pictures will appear (locally or globally) alternatively dark (low intensity illumination) and bright (high intensity illumination). Typically, all artificial lights are powered by either alternating current (AC)—which varies continuously as a sines law with period T or pulse-width modulated (PWM) current—which alternates between 'on' and 'off' modes in a discrete way. While flickering due to light sources powered by AC current can be attenuated relatively easily (by adjusting the exposure time of the acquisition system to be a multiple of the known period T), it is much more difficult to mitigate the flickering effect when the light source is PMW. As a consequence, the observed flickering/flashing appears as an artifact in the video. This artifact can be particularly disturbing insofar as it may convey a wrong information (e.g., flashing is often the signal of distress, or used to capture attention). It is noted that this phenomena is also related to the relatively short exposure time (~ms) of the video acquisition system (at least shorter than the duty cycle of the PWM illuminant). Conversely, the human eyes integrate the visual information over time, and this is why most people are oblivious to fluctuating light sources in their environment.

Video capture devices are becoming ubiquitous and have a wide range of applications, from video camera surveillance in public or private places, to on-board systems in robotics applications. For example, image capture devices are being utilized on vehicles to capture the environment about the vehicle. Surround view cameras (backup, front-viewing, side-viewing), are or will become a standard in vehicles. Similarly, PWM lightings, in particular Light Emitting Diode (LED) lights, are more and more ubiquitous in public and private places, due to their low cost and high robustness.

SUMMARY OF INVENTION

An advantage of an embodiment is the detection of flickering in a video stream and a correction of the undesirable visual effect caused by the flickering. The method and system described herein takes input video frames (from a video stream or from offline recorded video data), and outputs an enhanced version of the frames, without loss of temporal or spatial resolution. A key aspect of the approach is to detect candidate flickering regions in each frame, using a machine learning classifier, and then apply texture synthesis to locally hallucinate texture with the correct illumination (i.e., illumination of high intensity) in frames and regions which appeared under-illuminated in the original video. In order to detect the candidate flickering regions in each frame, a local spatio-temporal descriptor is computed in each overlapping cells of a 3D grid. The three dimensions of the grid accounts for space (two dimensions) and time (1 dimension). Using a labeled dataset (where cells are labeled positively when the region covered is flickering, negatively otherwise), a binary classifier can be learned. At testing time, the learned binary classifier is applied, using a sliding window strategy, so as to detect candidate flickering cells/regions in each frame or in frames sampled at regular time intervals. Upon detection, a candidate region at time t, will be fine matched (at subpixel accuracy) with the most similar region in the neighborhood in the previous frame at t-1 to fine track the flickering region over time (tracking between two consecutive frames is sufficient if detection is applied frame-wise). The set/series of regions tracked over time corresponding to a given flickering area in the image constitutes a tracklet, which is of fixed length and updated at each new frame. Using the temporal set of regions provided in a tracklet, a texture mapping can be synthesized that hallucinates a correctly illuminated texture of the given region in the image. When the candidate flickering region/cell in frame t is detected as 'off' (under illuminated), the synthetic texture is blended to the region to render the region as if it was correctly lit. In the best cases, flickering rate can be estimated by analysis the frequency of off and on cells in the tracklet.

An embodiment contemplates a method of detecting and correcting flicker. A video stream of a scene at various instances of time is captured by an image capture device. A local spatio-temporal feature extraction technique is applied, by a processor, to regions of the capture scene within each frame. Candidate flickering region detection is applied, by a classifier, to identify candidate regions. Corresponding candidate regions are tracked over time to detect illumination differences within each analyzed region. An illumination correction technique is applied to the candidate regions where flickering is detected. A flicker-free video is output on a display device.

DETAILED DESCRIPTION

The following detailed description is meant to be illustrative in understanding the subject matter of the embodiments and is not intended to limit the embodiments of the subject matter or the application and the uses of such embodiments. Any use of the word "exemplary" is intended to be interpreted as "serving as an example, instance, or illustration." Implementations set forth herein are exemplary and are not meant to be construed as preferred or advantageous over other implementations. The descriptions herein are not meant to be bound by any expressed or implied theory presented in the preceding background, detailed description or descriptions, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, (e.g., memory elements, digital signal processing elements, logic elements, look-up tables, or the like, which may carry out a variety of functions under the control of one or more microprocessors or other control devices).

When implemented in software, various elements of the systems described herein are essentially the code segments or computer-executable instructions that perform the various tasks. In certain embodiments, the program or code segments are stored in a tangible processor-readable medium, which may include any medium that can store or transfer information. Examples of a non-transitory and processor-readable medium include an electronic circuit, a microcontroller, an application-specific integrated circuit (ASIC), a semiconductor memory device, a ROM, a flash memory, an erasable ROM (EROM), a floppy diskette, a CD-ROM, an optical disk, a hard disk, or the like.

The system and methodology described herein can be utilized to identify flickering for any type of video recording and in any environment. While the approach and methodology are described below with respect to video recorders used in vehicle applications, one of ordinary skill in the art appreciates that an automotive application is merely exemplary, and that the concepts disclosed herein may also be applied to any other suitable systems including, but not limited to, portable video recorders, fixed video recorders, smartphones, and tablets.

The term "vehicle" as described herein can be construed broadly to include not only a passenger automobile, but any other vehicle including, but not limited to, mobile devices, rail systems, planes, off-road sport vehicles, robotic vehicles, motorcycles, trucks, sports utility vehicles (SUVs), recreational vehicles (RVs), marine vessels, aircraft, farming vehicles, and construction vehicles or any other device or system that utilizes a video recorder.

Figure 1:
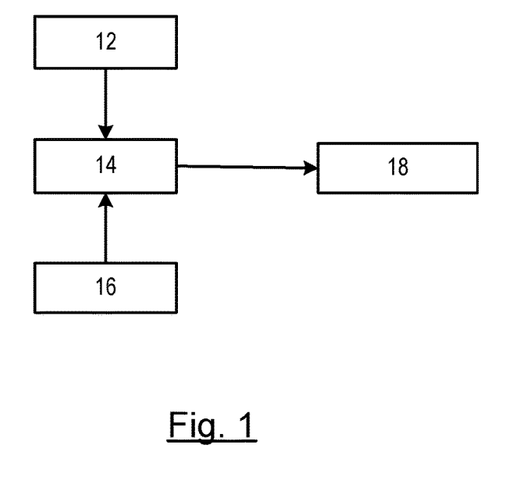
FIG. 1 illustrates an adaptive video flickering reduction system.

There is shown in FIG. 1 an adaptive video flickering reduction system. The adaptive video flickering reduction system includes a video capture device 12, a processor 14, memory 16, and a display device 18. While the following example describes the video flickering reduction system used in a vehicle, it should be understood that the system can be used by any image capture devices that record video where flickering is present.

The image capture device 12 may include one or more of image capture devices. For example, in vehicle applications, images captured by the image capture devices may be used to replace side view mirrors on the vehicle. Side view mirrors cause wind resistance on the vehicle and the elimination of side view mirrors assist in providing an aerodynamic airflow around the vehicle to increase fuel economy. The captured images may be displayed on the interior display devices for depicting what a driver would customarily see in the reflection of the side view mirrors. The image capture device 12 may provide video of a scene typically seen on the rearview mirror display. In addition, the image capture device 12 may capture video rearward of the vehicle that would typically be seen in reverse driving mode. Moreover, the image capture device 12 may be positioned to capture video of the path of travel to provide visual awareness to the driver.

The display device 18 may include one or more display devices that outputs and displays video captured by the image capture device 12.

The memory 16 is a storage device that may store captured video (original video stream or processed data).

The processor 14 is coupled to the image capture device 12 and memory 16 for processing the video captured by the image capture device 12. The processor 14 may be a standalone processor or a shared processor of another device. The processor 14 analyzes patches within the image frames at different instances of time to detect candidate regions where LED flickering has affected the image. The processor 14 tracks frame by frame the respective candidate regions to determine when flickering correction should be applied. In addition, based on an estimated flickering rate, the processor 14 can predict when and where flickering will occur in a respective frame and apply flickering correction to that frame.

Figure 2:
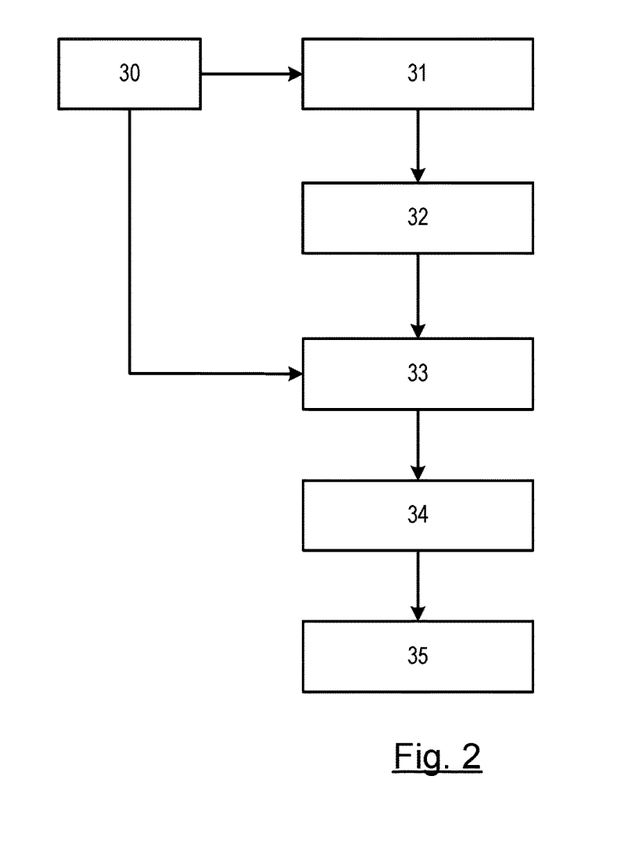
FIG. 2 is a flow diagram to detecting and correcting the effects of flicking in an image.
Figure 3:
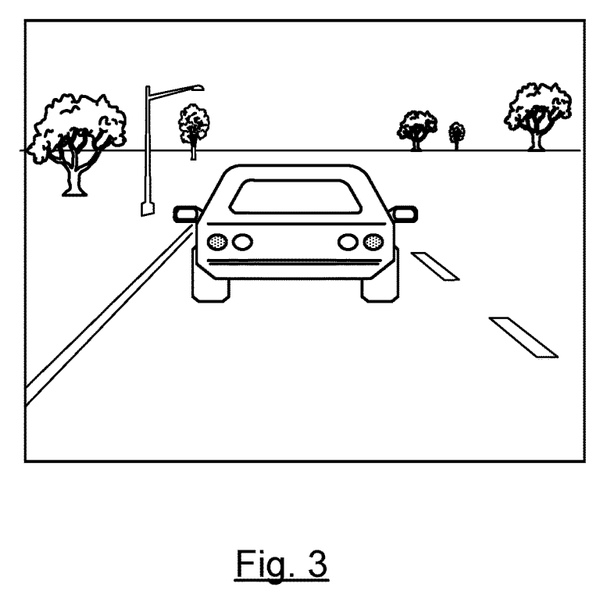
FIG. 3 is an exemplary image captured by the image capture device at a first instance of time.
Figure 4:
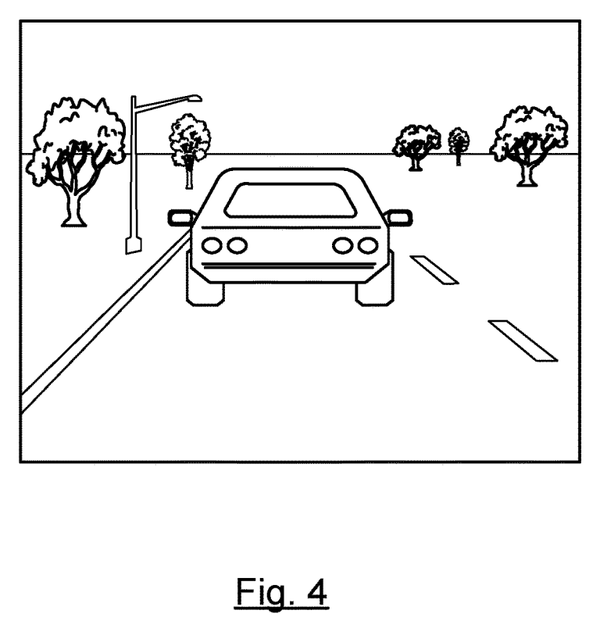
FIG. 4 is the exemplary image captured by the image capture device at a second instance of time.

FIG. 2 illustrates a flow diagram for detecting and correcting the effects of flickering in an image. In step 30, images obtained from the image capture device are input to the processor for analyzing. FIG. 3 illustrates a first image captured by the image capture device at a first instance of time. FIG. 4 illustrates a second image captured by the same image capture device at a second instance of time, the second instance of time being after the first instance of time. It is noted that tail lights are illuminated in FIG. 3, but not in the image of FIG. 4 due to flickering.

Figure 5:
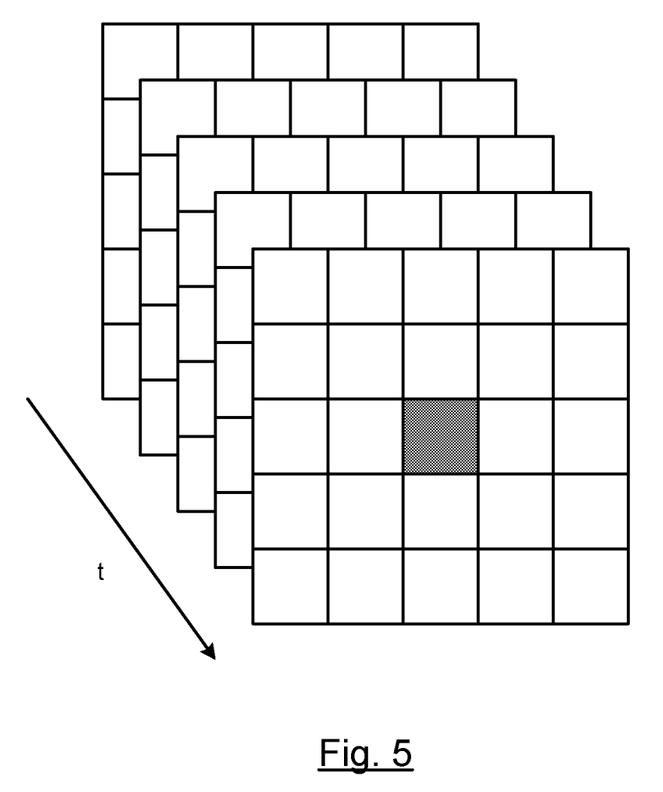
FIG. 5 illustrates an exemplary multi-scale time and space window grid.

In step 31, cells/patches of the image are analyzed for flickering region detection. The image is first decomposed into overlapping cells of a regular grid. For each cell, a spatio-temporal descriptor is computed. A multi-scale time and space window utilized as shown in FIG. 5. The window typically is sized from 4 to 16 pixels in space and from 4 to 16 consecutive frames in time at a space/time step of 2). A three-dimensional (3D) spatio-temporal descriptor encodes fluctuations of lighting intensity in cells where flickering occurs. In cells where no flickering occurs, the illumination is either constant or varies smoothly. Although the descriptor can be devised in various ways, a proposal here is to use the amplitude of the first k coefficients (co, c1, c2, . . . ck) of a Fast Fourier Transform of the average intensity computed at each temporal slice of the 3D descriptor. Alternatively, other solutions that can be used include, but are not limited to, is a 3D extension of a Local Binary Pattern (LBP). In addition, combination of descriptors could be used. The descriptor provides a local signature of the data that characterizes a temporal variation of an intensity of the image locally.

In step 32, to detect flickering candidate regions, a machine learning classifier is applied to the descriptors. A binary classifier is learned using positive and negative label samples. A positive label sample is associated to a cell which covers a region in the image that is affected by flickering.

Figure 6:
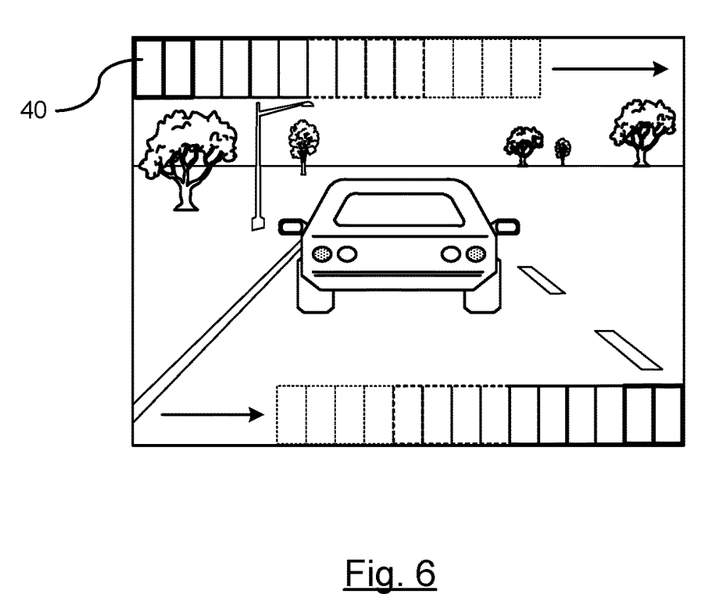
FIG. 6 illustrates an exemplary sliding window detection technique applied to the image captured at the first instance of time.
Figure 7:
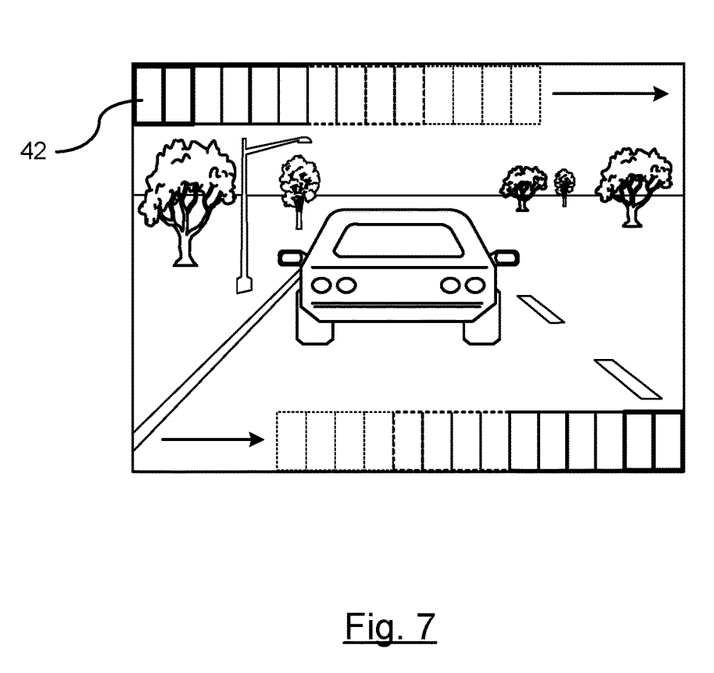
FIG. 7 illustrates the exemplary sliding window detection technique applied to the image captured at the second instance of time.
Figure 8:
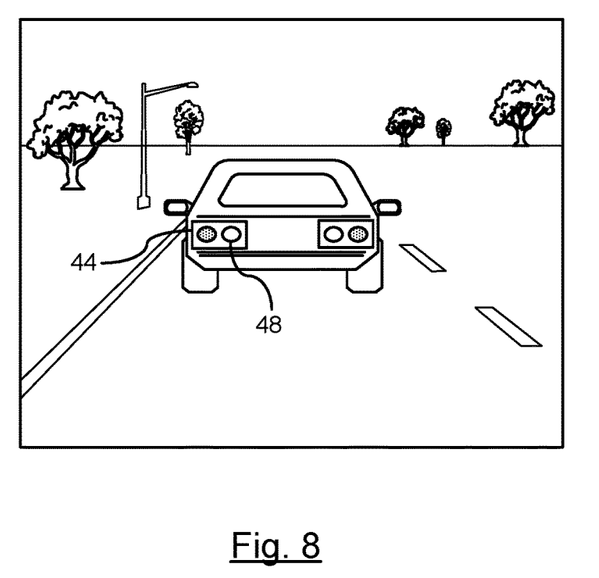
FIG. 8 illustrates candidate regions selected identifying illuminated tail lights in the first image.
Figure 9:
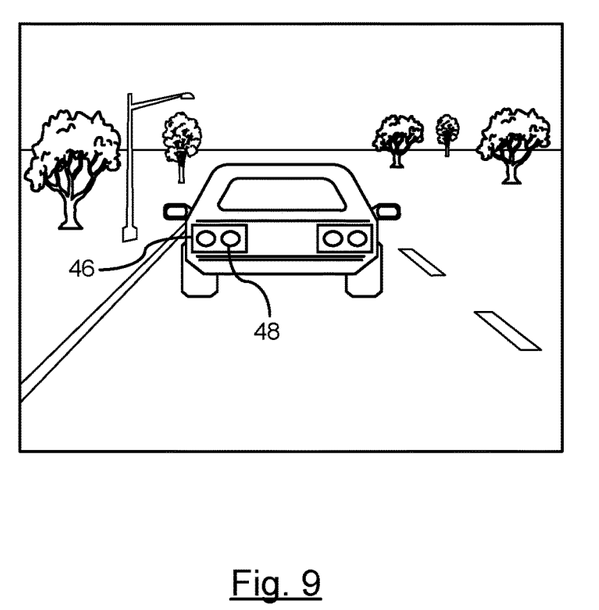
FIG. 9 illustrates candidate regions selected identifying non-illuminated tail lights in the second image.

Alternatively, a negative label is associated to a cell which is not affected by flickering. Exemplary binary classifiers include, but are not limited to, a Support Vector Machine (SVM). In a video frame at testing time, in order to detect the candidate flickering region, the system utilizes a sliding window strategy. The classifier is applied in each of the cells (at multi-scale in three dimensions), scanning the image from left to right/top to down as shown in FIGS. 6 and 7 of each image. It should be understood that the sliding window configuration as described herein is exemplary and that any pattern of movement or direction may be used. As shown in FIGS. 6 and 7, regions or patches are analyzed by the classifier. FIGS. 8 and 9 illustrate respective candidate regions 44 and 46 that are identified for potential flickering. The detection is applied at every frame or at frames taken at regular time intervals.

The detected candidate flickering cells in the current frame might overlap or be connected. All connected cells are clustered to form compact candidate flickering regions R(x, y). Dominant flickering regions are retained using a simple heuristic.

Figure 10:
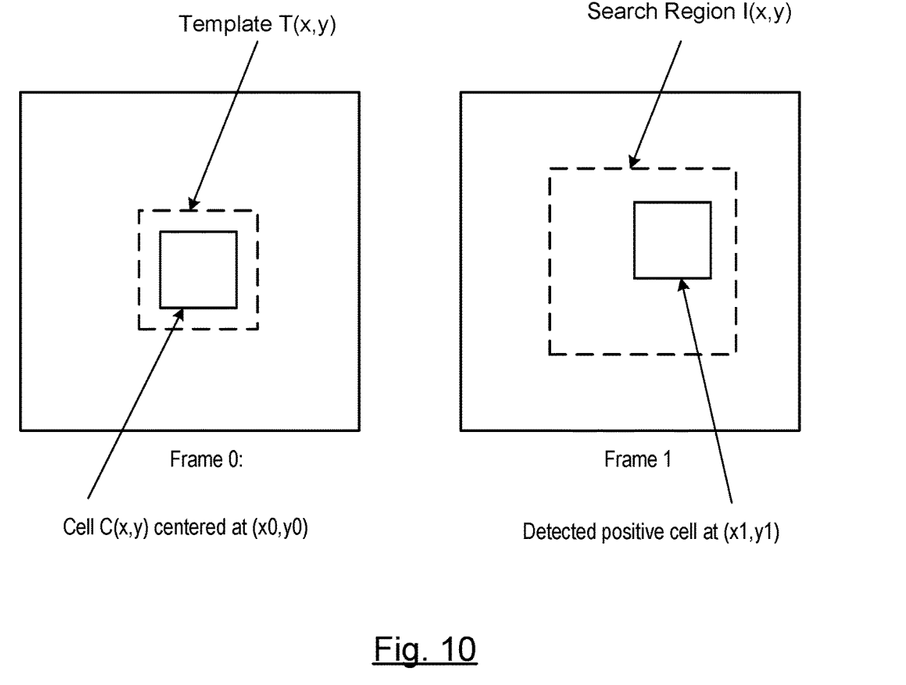
FIG. 10 illustrates a temporal correlation of cell tracking between two frames.

In step 33, the detected flickering candidate regions are fine tracked over a period of time. A given region R detected at frame t of size (sx, sy) in space and centered in (x0, y0) will be matched at a subpixel level with the locally most similar region in frame t−1. The match is performed by maximizing a weighted normal cross correlation criteria (NCC) between the template $T_t$, and the frame at time t−1. The search space in frame t−1 is centered at pixel (x0, y0) and covers a region of pre-determined size (calculated as a function of $C_t$ size). The search space can be further focused using prior information. The template $T_t$ includes the region R plus a certain margin on each side. The template is centered, in frame t, at (x0, y0) and covers an area of size (sx+Δx, sy+Δy) as illustrated in FIG. 10. It should be noted that any similarity other than the NCC can be used as well. The NNC may be represented as follows:

$$NCC(u,v) = \left\langle \frac{T'}{\|T'\|}, \frac{I(u,v)}{\|I(u,v)\|} \right\rangle = \frac{\sum_{x,t} w(x,y)T(x,y)I(x+u,y+v)}{\sqrt{\sum_{x,y} w(x,y)^2 T(x,y)^2 \sum_{x,y} I(x+u,y+v)^2}}$$

where T'=T o w (o denoting the entrywise product). Weights are computed as a monotonic decreasing function, from value 0 at the center of the cell (x0, y0), to value 1 at its borders. Typically, the weighting function will be as follows:

$$w(x,y)=1-g(x,y;\sigma,x0,y0).$$

where g(x, y; σ, x0, y0) is a normalized Gaussian distribution of variance sigma as defined as:

$$g(x,y;\sigma,x0,y0) = \frac{1}{(2\pi\sigma^2)} \exp^{-((x-x_0)^2+(y-y_0)^2)/(2\sigma^2)}$$

where σ represents the Gaussian variance. It is also noted that any other function with similar behavior could be used instead of a Gaussian distribution.

This weighting factor places more importance to pixels values near the border of the enlarged cell, rather than at its center since the center of the region may be affected by change in illumination, whereas the region in the extended area by construction is less affected. The weighted NCC score should then be invariant to illumination change of the region center.

The tracking of the detected candidate flickering regions is applied between consecutive frames (i.e., at least two consecutive frames). The set/series of regions tracked over time, corresponding to a given area in the scene, constitutes a tracklet. The tracklet is of fixed length and updated at each new frame. At each new frame where the classifier is applied, an attempt is made associate each detected candidate region to one of the existing/current tracklets. If there is an association, the candidate region is added to the set, and the last element of the set is removed. If there is no association, a new tracklet is initiated.

In step 34, for each flickering region, the tracklet enables us to generate a synthetic texture mapping. The synthetic texture hallucinates a correctly lit image (i.e., in each flickering region individually). The synthetic texture mapping can be obtained in several ways. A first step includes selecting, for a given tracklet, which regions of the temporal series are correctly illuminated (e.g., those with high intensity) and which regions are not. This is determined using a simple heuristic. A second step includes combining the respective regions to create a synthetic texture S(x,y), which aims at replacing the pixels in R(x,y). The strategy varies according to the shutter system of the camera (e.g., global shutter vs rolling shutter). In image capture devices with a global shutter system, the synthetic image can be generated directly from the most recent correctly lit sample of the given tracklet set. In a ruling shutter system, the synthetic texture is generated by merging several samples of a tracklet.

When the candidate flickering region of the current frame is detected as 'off' (i.e., under exposed), the synthetic texture is blended to the region. Blending between synthetic texture S and the image region R is performed as follows:

$$\tilde{R}(x,y)=\alpha(x,y)S(x\cdot y)+(1-\alpha(x,y))R(x,y)$$

where α is a weight factor which takes a value between [0,1]. It is a monotonously decreasing function from the center of the region (x0, y0) to its border. Consequently, at its border where no or little flickering is present, strong weights are applied to the original region R, whereas at the center, a synthetic image S is preferred. The synthetic texture is then smoothly blended to the original image region.

Figure 11:
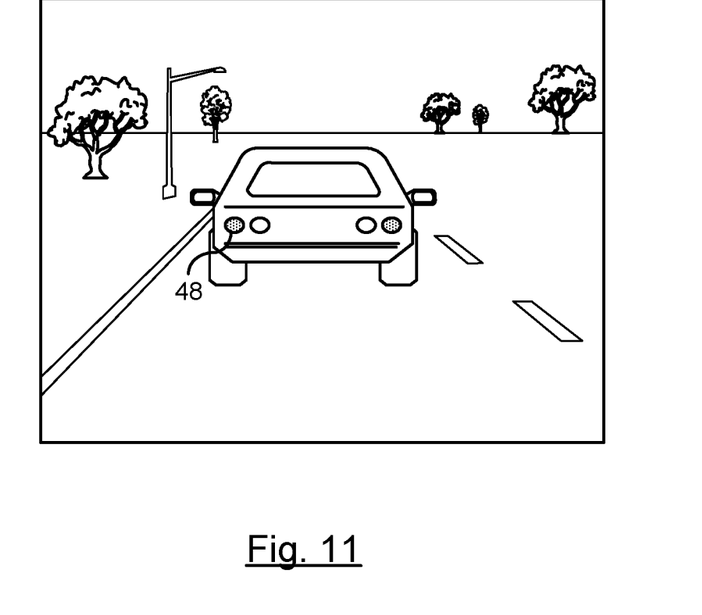
FIG. 11 illustrates an unaltered image obtained at the first instance of time.
Figure 12:
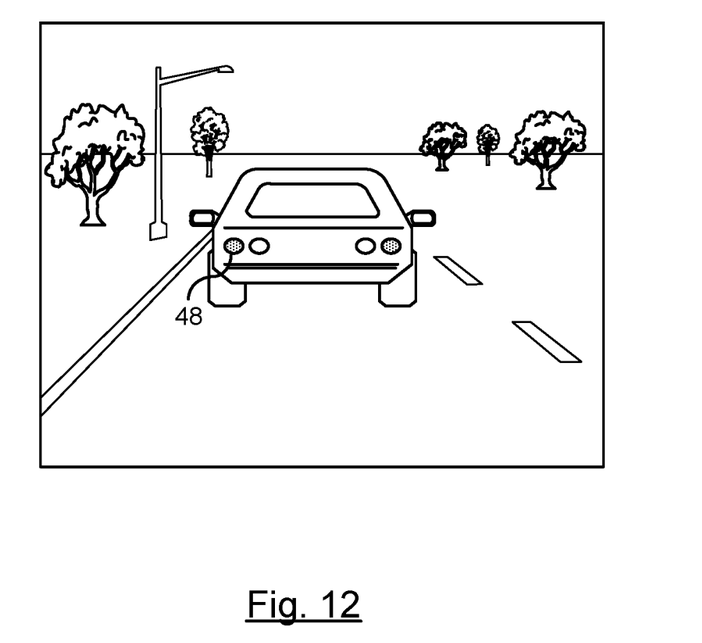
FIG. 12 illustrates an altered image obtained at the second instance of time.

FIGS. 11 and 12 illustrate a comparison of the tail lights 48 after rendering is applied. FIG. 11 illustrates an image at the first instance of time where the tail lights as captured in the image as shown are illuminated. FIG. 12 illustrates the tail lights 48 at the second instance of time where the tail lights 48 are rendered by applying the texture-analysis technique to illuminate the tail lights 48 as would be captured in flickering were not present. This provides a flicker-free video output.

In addition, based on the detected illumination versus non-illumination frames, a flickering rate may be detected. That is, if flickering of the illumination source is performed at a respective rate, then the flicker rate can be detected from the images based on a time period between frames with the candidate region illuminated and the candidate region non-illuminated. If a flickering rate is determined, then the system can autonomously apply flicker correction to those respective frames that coincide with the determined flicker rate.

In step 35, as shown in FIG. 12, the results of the processing exhibit a flickering free video. The originally flickering regions remain illuminated in all image frames.

While certain embodiments of the present invention have been described in detail, those familiar with the art to which this invention relates will recognize various alternative designs and embodiments for practicing the invention as defined by the following claims.

What is claimed is:

1. A method of detecting and correcting flicker comprising the steps of:
    capturing a video stream of a scene at various instances of time by an image capture device;
    applying a local spatio-temporal feature extraction technique, by a processor, to regions of the capture scene within each frame;
    applying candidate flickering region detection, by a classifier, to identify candidate regions;
    tracking corresponding candidate regions over time to detect illumination differences within each analyzed region;
    applying an illumination correction technique to the candidate regions where flickering is detected; and
    outputting a flicker-free video on a display device.

2. The method of detecting and correcting flicker of claim 1 wherein the step of applying the local spatio-temporal feature extraction technique includes a computation of a local-spatio temporal descriptor to encode a temporal change of the illumination in a respective region of the image.

3. The method of detecting and correcting flicker of claim 2 wherein the local spatio-temporal descriptor is extracted based on an amplitude of the coefficients of a Fast Fourier Transform of average intensity of the image locally.

4. The method of detecting and correcting flicker of claim 2 wherein the local spatio-temporal temporal feature extraction technique computes the local spatio-temporal descriptor as a function of a combination of descriptors.

5. The method of detecting and correcting flicker of claim 2 wherein applying candidate flickering region detection, by a classifier, to identify candidate regions utilizes a set of positive candidates and a set of negative candidates.

6. The method of detecting and correcting flicker of claim 1 wherein the classifier includes a binary classifier that is applied to the descriptor in each cell of a multi-scale grid to identify candidate regions where flickering is present.

7. The method of detecting and correcting flicker of claim 6 wherein a sliding window is applied to each frame for analyzing each cell of the multi-scale grid.

8. The method of detecting and correcting flicker of claim 1 further comprising the step of determining overlapping cells that are connected, wherein the respective cells determined as candidate regions that are connected are clustered to form compact candidate flickering regions.

9. The flicker detection and correction system of claim 1 wherein tracking the candidate regions over a period of time includes matching a respective frame of a respective size at a subpixel level with a substantially similar region in a prior frame.

10. The method of detecting and correcting flicker of claim 9 wherein tracking the candidate regions over time includes identifying the regions as tracklets that are of a fixed length and updated at each new frame.

11. The method of detecting and correcting flicker of claim 10 wherein the tracklets are updated in each new captured frame.

12. The method of detecting and correcting flicker of claim 10 wherein at each new captured frame where classification is applied, each candidate is associated to a current tracklet, wherein if an association is present the new candidate region is maintained and the last candidate region is removed.

13. The method of detecting and correcting flicker of claim 12 wherein if an association is not present, then a new tracklet is initiated.

14. The method of detecting and correcting flicker of claim 10 wherein applying an illumination correction technique includes applying a texture-synthesis technique, wherein the texture-synthesis technique is applied using each tracklet to create synthetic patches that eliminate flickering and illuminate images locally in each of the flickering images.

15. The method of detecting and correcting flicker of claim 14 wherein the processing applies an image blending technique, the image blending technique blends each synthetic patch into the current frame when flickering regions of the original frame are insufficiently illuminated.

16. The method of detecting and correcting flicker of claim 1 further comprising the step of applying a fine matching between a detected flickering region of a current frame and a previous frame.

17. The method of detecting and correcting flicker of claim 16 wherein applying the fine matching between the detected flickering region of the current frame and the previous frame is maximized using a similarity score.

18. The method of detecting and correcting flicker of claim 1 further comprising the step of applying a fine matching between a detected flickering region of a current frame and a previous frame is performed by maximizing weighted normal cross correlation criteria between the current frame and a previous frame.

19. The method of detecting and correcting flicker of claim 1 wherein the processor determines a flicker rate of the illumination light source, wherein the processor autonomously utilizes the flickering rate to apply an illumination correction schedule to frames affected by flickering.

20. The method of detecting and correcting flicker of claim 1 further comprising the steps of providing the flicker-free video to the processor for additional processing.

* * * * *